No. 619,092. Patented Feb. 7, 1899.
C. SEYMOUR.
SHAPING MACHINE.
(Application filed Sept. 30, 1898.)
(No Model.)

WITNESSES:

INVENTOR
Charles Seymour
BY
ATTORNEYS.

UNITED STATES PATENT OFFICE.

CHARLES SEYMOUR, OF DEFIANCE, OHIO, ASSIGNOR TO THE DEFIANCE MACHINE WORKS, OF SAME PLACE.

SHAPING-MACHINE.

SPECIFICATION forming part of Letters Patent No. 619,092, dated February 7, 1899.

Application filed September 30, 1898. Serial No. 692,317. (No model.)

*To all whom it may concern:*

Be it known that I, CHARLES SEYMOUR, of Defiance, in the county of Defiance and State of Ohio, have invented a new and Improved Shaping-Machine, of which the following is a full, clear, and exact description.

The invention relates to woodworking machinery; and its object is to provide a new and improved shaping-machine more especially designed for perfectly, rapidly, and automatically rounding or smoothly shaping the outer portion of the handhold on D-handles intended for shovels, spades, forks, and other implements.

The invention consists of certain parts and details and combinations of the same, as will be fully described hereinafter and then pointed out in the claim.

Reference is to be had to the accompanying drawings, forming a part of this specification, in which similar characters of reference indicate corresponding parts in both the figures.

Figure 1:
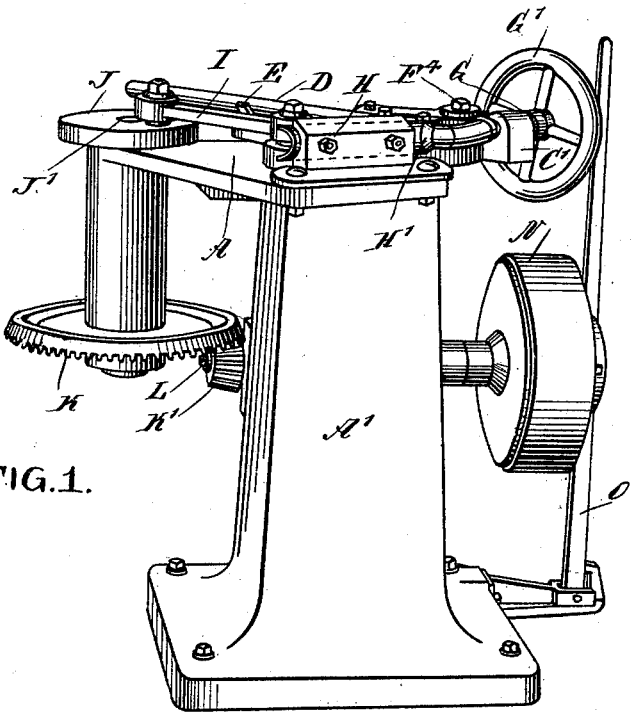
Figure 2:
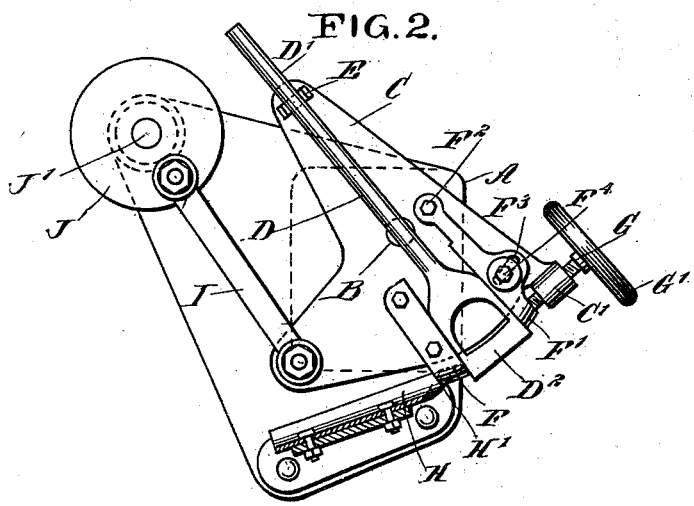

Figure 1 is a perspective view of the improvement, showing the handle in position after the operation; and Fig. 2 is a plan view of the same with the driving-gear omitted and the handle shown in position at the beginning of the operation.

The improved shaping-machine is provided with a table A, mounted on a suitable standard A' and carrying a pivot B for an oscillating carriage C, mounted to swing on top of the table. The carriage C is adapted to support the handle D or other article to be treated, the said handle resting with its shank D' in a fork E, carried by the carriage, and the handhold $D^2$ of the said handle is engaged on opposite sides by the clamps F and F', of which the clamp F is rigidly secured to the carriage C, and the clamp F' is fulcrumed at $F^2$ on the said carriage. A screw G screws in a nut C' formed on the carriage to engage the free end of the pivoted clamp F', so as to move the latter in firm contact with one side of the handhold $D^2$, whereby the latter is securely clamped in position between the clamps F and F'.

The pivoted clamp F' is provided with a segmental slot $F^3$, through which passes a bolt $F^4$, attached to the carriage C, to properly guide the clamp F' in its oscillating movement. The screw G is provided with a hand-wheel G', under the control of the operator, for readily turning the screw up against the clamp F' for moving the latter into engagement with the handhold in order to secure the handle in place on the carriage and to release the said clamp F' when it is desired to remove the finished handle and replace the same by another to be treated.

On top of the table A is secured a knife or cutter H, having a semicircular cutting edge H', against which is moved the outer portion of the handhold $D^2$ upon oscillating the carriage, so as to round off the said outer portion of the handhold, as will be readily understood by reference to Fig. 1.

In order to impart an oscillating motion to the carriage C, I connect the latter by a pitman I with a crank-disk J, secured on the upper end of a vertically-disposed shaft J', journaled in suitable bearings carried on the under side of the table A. On the lower end of the shaft J is secured a bevel gear-wheel K, in mesh with a bevel-pinion K', fastened to one end of a driving-shaft L, journaled on the standard A' and carrying a friction-clutch pulley N, connected by a belt with suitable machinery for imparting a rotary motion to the said pulley. A lever O, under the control of the operator, serves to actuate the friction-clutch for the friction-clutch pulley to rotate the shaft L whenever it is desired to do so. Now it is evident that when the shaft L is rotated a rotary motion is transmitted by the pinion K' and gear-wheel K to the shaft J', so that the crank-disk J and pitman I cause an oscillation of the carriage C to move the handhold $D^2$ against the knife-edge H', so as to give the desired shape to the outer portion of the handhold $D^2$. On the return stroke of the carriage C the handhold $D^2$ passes clear of the knife H, and at this time the operator stops the machine by manipulating the hand-lever O, and then turns the hand-wheel G' to release the clamp F', so as to permit the operator to remove the finished handle D and to place another to be treated into the fork E and between the clamps F and F'. The hand-wheel G' is now turned in the opposite direction to move the clamp F' up against the handle to clamp the handhold thereof securely in position. The machine is now started again to impart an oscillating motion to the carriage C and the above-described operation is repeated.

It will be seen that by the arrangement described the outer portion of the handhold $D^2$ of the handle is completely finished at one oscillation of the carriage, so that an operator with a single machine can finish a large number of handles in a comparatively short time.

Having thus fully described my invention, I claim as new and desire to secure by Letters Patent—

In a shaping-machine, the combination with a frame or standard having a table at the top thereof, of a carriage mounted to rock horizontally on the table, jaws held by the carriage for clamping the work thereon, a knife fixed to the table and engaged by the work as the table swings, a vertically-extending shaft mounted in the table, a link connected with the carriage and having cranked connection with the shaft, and gearing located below the table and carried by the frame or standard, such frame being connected with the vertically-extending shaft, to drive the same.

CHARLES SEYMOUR.

Witnesses:
VALENTINE HERMANN,
GEO. W. DEATRICH.